United States Patent [19]

Scholl et al.

[11] Patent Number: 5,691,698
[45] Date of Patent: Nov. 25, 1997

[54] IDENTIFICATION AND/OR SENSOR SYSTEM

[75] Inventors: Gerd Scholl, München; Leonhard Reindl, Stephanskirchen; Werner Ruile, München; Thomas Ostertag, Ulm, all of Germany

[73] Assignee: Siemens Aktiengesellschaft, Munich, Germany

[21] Appl. No.: 422,452

[22] Filed: Apr. 17, 1995

[30] Foreign Application Priority Data

Apr. 15, 1994 [DE] Germany ............................ 44 13 211.5

[51] Int. Cl.⁶ .................................................. G08B 13/14
[52] U.S. Cl. ................. 340/572; 310/313 R; 310/313 B; 310/313 D; 333/154; 333/195; 333/142; 333/153; 342/51; 342/44
[58] Field of Search .......................... 340/572; 342/51, 342/44; 333/154, 195, 142, 153; 310/313 R, 313 D, 313 B

[56] References Cited

U.S. PATENT DOCUMENTS

| | | | |
|---|---|---|---|
| 4,096,740 | 6/1978 | Sallee | 310/313 |
| 4,462,011 | 7/1984 | Ward | 333/154 |
| 4,625,208 | 11/1986 | Skeie et al. | 310/313 D |
| 4,737,790 | 4/1988 | Skeie et al. | 310/313 D |
| 4,746,830 | 5/1988 | Holland | 310/313 D |
| 4,752,680 | 6/1988 | Larsson | 235/492 |
| 5,056,055 | 10/1991 | Shinonaga | 310/313 R |
| 5,144,262 | 9/1992 | Hunsinger | 310/313 R |
| 5,359,250 | 10/1994 | Toda | 310/313 R |
| 5,381,137 | 1/1995 | Ghaem et al. | 340/572 |

FOREIGN PATENT DOCUMENTS

| | | |
|---|---|---|
| 2 208 058 | 2/1989 | United Kingdom. |
| 2 238 210 | 5/1991 | United Kingdom. |
| 2 246 492 | 1/1992 | United Kingdom. |

OTHER PUBLICATIONS

Siemens Publ. (Linhardt), Sep. 25, 1973, pp. 1–16 "Anwendungsmöglichkeiten des Mikrowellensystems SIC".

*Primary Examiner*—Jeffery Hofsass
*Assistant Examiner*—Benjamin C. Lee
*Attorney, Agent, or Firm*—Herbert L. Lerner; Laurence A. Greenberg

[57] ABSTRACT

An identification and/or sensor system includes an identification and/or sensor configuration having resonators for determining at least one parameter to be interrogated. The resonators have a quality being good enough to effect a storage of energy in the resonators. A transmitting and receiving apparatus transmits interrogation signals by radio to the identification and/or sensor configuration and receives and evaluates reply signals transmitted back from the identification and/or sensor configuration. The transmitting and receiving apparatus is a broadband device.

8 Claims, 2 Drawing Sheets

5,691,698

IDENTIFICATION AND/OR SENSOR SYSTEM

BACKGROUND OF THE INVENTION

FIELD OF THE INVENTION

The present invention relates to an identification and/or sensor system, having a transmitting and receiving apparatus which transmits interrogation signals by radio to an identification and/or sensor configuration and receives and evaluates reply signals transmitted back from the latter, wherein resonators are provided in the identification and/or sensor configuration for determining at least one parameter to be interrogated.

In a microwave interrogation system which has been developed by the applicant and disclosed and which is designated by the term SICARID, a transmitter is provided in a reading device and emits microwaves, which are reflected by a reply device provided on an object to be identified, are picked up once more by the receiver in the reading device and are subsequently further processed. The reply device contains coaxial resonators tuned to different resonant frequencies. The transmitting frequency range in that configuration lies in the GHz range. The transmitting frequency range is swept through over time, with the resonators always removing energy from the wave being received and reflected by the reply device when the momentary transmitting frequency coincides with the resonant frequency of one of the resonators. As a result, the information encoded in the reply device is modulated onto the reflected wave and is transmitted to the reading device. Since such a system operates in the GHz range and, in that configuration, resonators which are specifically matched to that frequency range must be provided, and a large system bandwidth and long interrogation times are necessary, it is far too complex, that is to say inter alia expensive, unwieldy, slow and large, for specific applications.

Furthermore, identification systems have been disclosed which have a transmitting/receiving apparatus and identification mark ID tags that can be interrogated by the latter and operate with surface acoustic waves, for example in the publication entitled "Siemens-Zeitschrift" [Siemens Journal], R and D Special, Spring 1993. ID tags of that type are components in which an electrical signal is converted by means of a converter into a surface acoustic wave, which is reflected at a series of reflectors, with the reflected surface acoustic wave being converted by a converter, which can be the same as the converter converting the electrical input signal, into an electrical signal once more. As a function of the configuration of the reflectors, a prescribed code is produced, which represents that ID tag. The electrical signal representing the code is transmitted back to the receiving device, as a result of which the location at which the ID tag is disposed can be identified. Identification systems of that type can be used in a large number of applications.

Corresponding systems can also be used as radio interrogation devices for sensors operating with surface acoustic waves, which are known as SAW sensors. The SAW sensor in that configuration defines at least one parameter which can be interrogated through radio.

In the case of previous ID tags and SAW sensors, the encoding of the information takes place in the time domain. Due to the relatively short transmission paths which can be implemented, the information must be transmitted and evaluated in a short time. That requires a large system bandwidth, which clashes with the continuously rising requirement for economy of frequencies and thus makes an implementation in the lower UHF range very difficult.

Since the systems need a relatively large bandwidth, bandwidths of that type can only be made available at high mid-frequencies by the telecommunications administrations. That leads to technological difficulties in the production of SAW components, or else to an unavoidably high attenuation of the SAW signals.

SUMMARY OF THE INVENTION

It is accordingly an object of the invention to provide an identification and/or sensor system, which overcomes the hereinafore-mentioned disadvantages of the heretofore-known devices of this general type and which can operate with a lower bandwidth.

With the foregoing and other objects in view there is provided, in accordance with the invention, a system for at least one of identification and sensing, comprising a configuration for at least one of identification and sensing having resonators for determining at least one parameter to be interrogated, the resonators having a quality being good enough to effect a storage of energy in the resonators; and a transmitting and receiving apparatus transmitting interrogation signals by radio to the configuration for at least one of identification and sensing and receiving and evaluating reply signals transmitted back from the configuration for at least one of identification and sensing, the transmitting and receiving apparatus being a broadband device.

In accordance with another feature of the invention, the transmitting and receiving apparatus includes a transmitting device for transmitting an interrogation pulse and a receiving device containing a Fourier transformation configuration for transforming a signal being transmitted back by the configuration for at least one of identification and sensing and being present in an amplitude/time spectrum, into an amplitude/frequency spectrum.

In accordance with a further feature of the invention, the configuration for at least one of identification and sensing is an identification mark ID tag to be interrogated, and the resonators are frequency-shifted SAW resonators forming an encoding of the ID tag.

In accordance with an added feature of the invention, a given number of the SAW resonators are encoded by activating/deactivating individual resonators.

In accordance with an additional feature of the invention, the ID tag has an ID tag receiving/transmitting antenna and the resonators are activated/deactivated by switching on/switching off the resonators to/from the ID tag receiving/transmitting antenna.

In accordance with yet another feature of the invention, the resonators have different phase positions.

In accordance with yet a further feature of the invention, the configuration for at least one of identification and sensing is a sensor configuration to be interrogated, and the resonators include at least one SAW resonator for detecting at least one variable.

In accordance with a concomitant feature of the invention, the resonators include a plurality of resonators having different mid-frequencies.

Other features which are considered as characteristic for the invention are set forth in the appended claims.

Although the invention is illustrated and described herein as embodied in an identification and/or sensor system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

The following should first be indicated in principle from the description and explanation of the exemplary embodiment.

As was already explained above, in the case of known systems of the type of the SICARID system, resonators are tuned to different frequencies, with the interrogation being tuned through a corresponding signal frequency band. Each time that the frequency of one of the resonators is reached, that resonator withdraws power from the interrogation signal, as a result of which the interrogation device "notices" the presence of the resonator.

The core of the system according to the invention is seen in the fact that the resonators have such a high quality that they are able to store energy. In the case of a broadband interrogation pulse, they therefore store energy which decays in accordance with a time function but is transmitted back to the receiving device.

Figure 1:
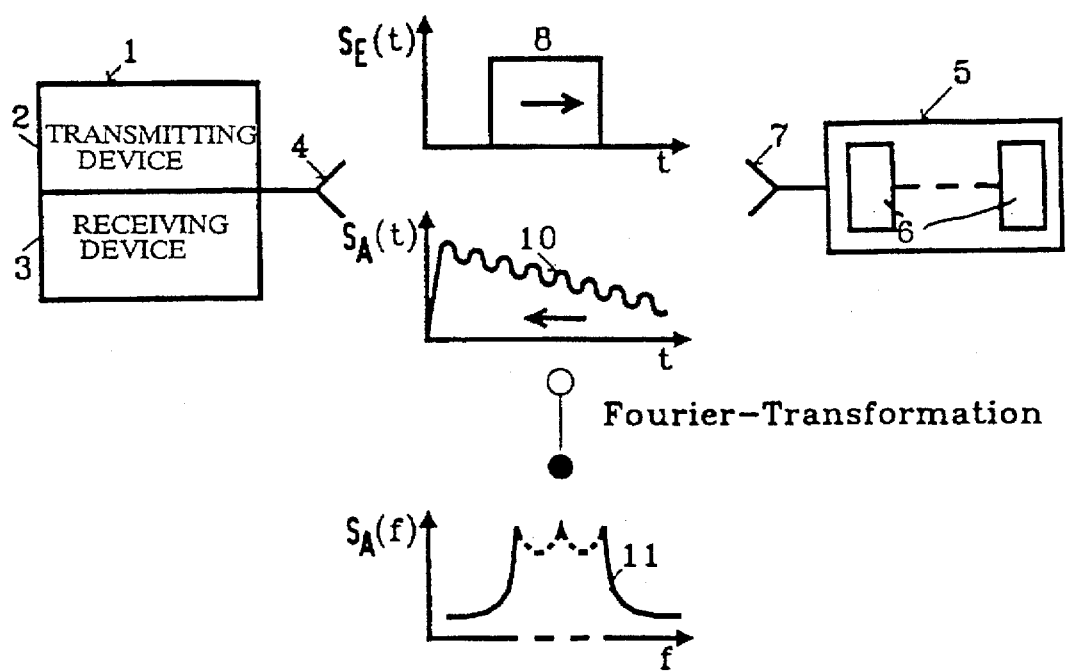
FIG. 1 is a schematic representation of a radio interrogation system having a transmitting/receiving apparatus and an SAW component as an element to be interrogated.

Referring now to the figures of the drawing in detail and first, particularly, to FIG. 1 thereof, there is seen a transmitting/receiving apparatus 1, which is known per se, for a radio interrogation system that includes a transmitting device 2, a receiving device 3 and an antenna 4 coupled thereto. The antenna can be used both as a transmitting antenna for interrogation signals transmitted from the transmitting device 2 as well as a receiving antenna for signals to be received by the receiving device 3. The transmitting and receiving devices 2, 3 can either be separate devices or they can be integrated in one single device. Since components of this type are known per se, they do not need to be explained herein in more detail.

An SAW component 5, which is to be interrogated by means of the transmitting/receiving apparatus 1, has an antenna 7 that picks up an interrogation pulse 8. The component 5 may be referred to as an identification and/or sensor configuration for at least one of identification and sensing. The interrogation pulse 8 has an amplitude $s_{(E)}(t)$ and is transmitted from the transmitting device 2 of the transmitting/receiving apparatus 1.

According to the invention, SAW resonators 6 are provided on the SAW component 5 which is shown schematically in FIG. 1. As will be explained in even more detail using FIGS. 2 and 3, these resonators 6 in each case contain an intermediate digital converter which is electrically coupled to the antenna 7 and converts the electrical signal picked up by the antenna 7 into a surface acoustic wave. Furthermore, the resonators 6 contain reflectors, into which the surface acoustic wave enters and is reflected. In so doing, the wave is reflected back onto the intermediate digital converter and is back-converted into an electrical signal, which is emitted through the antenna 7 and is picked up through the antenna 4 by the receiving device 3 in the transmitting/receiving apparatus 1.

Figure 2:
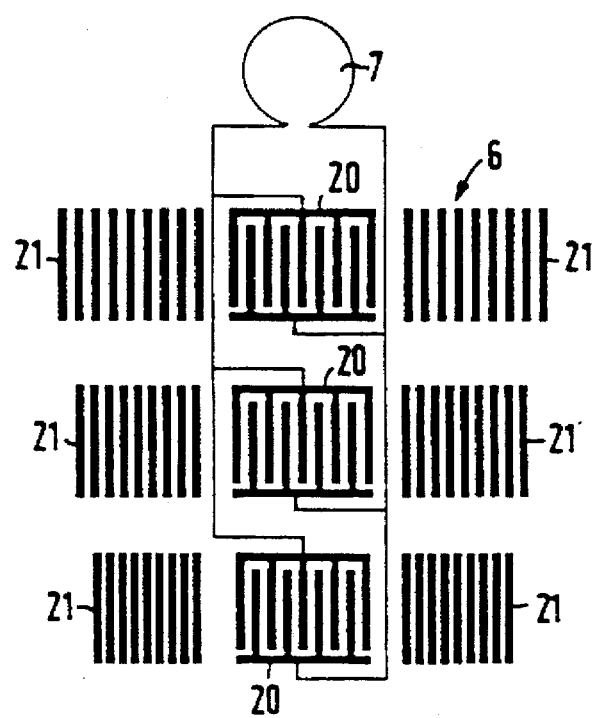
FIG. 2 is a diagrammatic view of an embodiment of SAW resonators for an SAW component which can be interrogated by radio.

FIG. 2 shows an embodiment of an identification and/or sensor configuration, which can be interrogated by radio and in this case is an SAW component in the form of an ID tag 5. A number of SAW resonators which are parallel to the antenna 7 are each formed by an intermediate digital converter 20 which is electrically connected to the antenna 7 and by reflectors 21 that are on opposite sides of the intermediate digital converter 20. The number of reflectors in this configuration is prescribed by the encoding envisaged for the ID tag. It should be pointed out that an SAW component and SAW resonators only represent an example. Resonators of other types, for example ceramic high-frequency resonators or the like, can also be used.

In this case the present invention is based on the idea that in the case of SAW components of the type in question an acoustic propagation time is realized which corresponds to a multiple of the non-illustrated length of a piezoelectric substrate, on which the intermediate digital converters 20 and the reflectors 21 are constructed. In this case, a multiple utilization of the available substrate length results. The long propagation times thus achievable enable a narrow-band transmission of the information. Therefore, a large number of items of information can be accommodated in a relatively narrowband frequency band.

Instead of the encoding in the time domain which has previously been applied in the case of ID tags, an encoding takes place in the frequency domain, in accordance with the invention. The encoding is achieved in the frequency domain through the use of a frequency shift of the resonators, which can be implemented in accordance with FIG. 2 by means of a different geometric construction of the reflectors, for example a different separation of electrode fingers in the reflectors for the respective resonators.

In the case of the interrogation of an ID tag of this type by means of a pulse 8 in accordance with FIG. 1, a signal results which is transmitted back to the receiving device and has an amplitude s(t) that decays over time as a function of a time t according to a curve 10. The result is resonances corresponding to the number of resonators 6 in the ID tag 5.

In the receiving device 3 of the transmitting/receiving apparatus 1, provision is made for a Fourier transformation configuration, that is known per se, which transforms the time function s(t) according to FIG. 1 into a corresponding frequency function s(f) in accordance with a lower curve 11 in FIG. 1, in which the amplitude is plotted as a function of a frequency f. The peaks in this curve 11 correspond to the resonant frequencies of the resonators 6 in the ID tag 5. In the lower diagram shown in FIG. 1, only three frequency peaks are represented for the sake of simplicity, with the central part of the curve 11 being shown in dashed lines in order to illustrate that even further frequency peaks can be present in this curve, corresponding to the number of resonators 6 in the ID tag.

Figure 3:
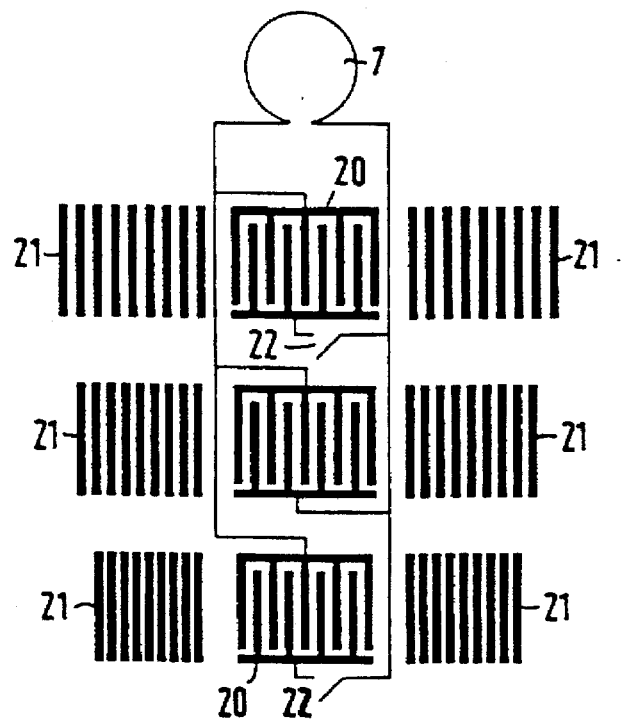
FIG. 3 is a diagrammatic view of a modified embodiment corresponding to the embodiment according to FIG. 2.

An encoding of an ID tag of the type shown in FIG. 2 can be carried out, for example in accordance with FIG. 3, in such a way that a predetermined fixed number of resonators is provided, with specific resonators being able to be switched in and switched out electrically in the circuit of the antenna 7 by means of switches 22. In FIG. 3 the same elements as in FIG. 2 are provided with the same reference symbols. This type of encoding represents an amplitude modulation.

Figure 4:
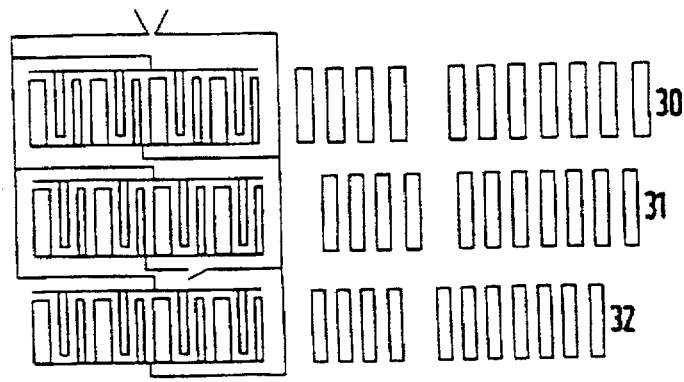
FIG. 4 is a diagrammatic view of embodiments of reflectors for SAW resonators of the type according to the invention.

According to a development of the invention, a quadrature amplitude modulation can also be applied, in which additional information is transmitted by means of the phase or the relative phase position of frequency-shifted resonators to one another. An embodiment of this type is illustrated diagrammatically in FIG. 4, which shows only reflectors 30 to 32 of SAW resonators. In this configuration, the phase information is achieved by means of a different geometric configuration of electrode fingers in the individual reflectors 30, 31 and 32.

In a system according to the invention, the bandwidth is determined by means of the number of mutually independent information states and the quality of the resonators, which determines the separation in terms of frequency of the information states. As already explained, an interrogation pulse is used in the form of the pulse 8, having a relatively narrow-band frequency spectrum, which covers the necessary system bandwidth. In accordance with the diagrams according to FIG. 1, the superimposed pulse replies of all of the resonators are received, with the information in the frequency domain being obtained by means of a Fourier transformation from the signal being transmitted back, which is originally present in the time domain.

A system in accordance with the invention is suitable not only for an interrogation of ID tags in the sense described above, but also for sensing purposes, with a parameter to be interrogated in the form of an external physical variable influencing the SAW velocity. As a result, the mid-frequency and the relative phase of the resonators are changed.

We claim:

1. A system for at least one of identification and sensing, comprising:

a transmitting and receiving apparatus transmitting broadband interrogation signals by radio;

a configuration for at least one of identification and sensing having resonators for determining at least one parameter to be interrogated, said resonators having a figure of merit enabling said resonators to store energy from a broadband radio signal received from said transmitting and receiving apparatus, whereby the stored energy decays according to a time function and is transmitted back to said transmitting and receiving apparatus as a reply signal; and said transmitting and receiving apparatus transmitting interrogation signals by radio to said configuration for at least one of identification and sensing and receiving and evaluating reply signals transmitted back form said configuration for at least one of identification and sensing, said transmitting and receiving apparatus being a broadband device;

wherein said resonators are SAW resonators forming an encoding of said configuration; wherein said configuration further has a receiving/transmitting antenna and said resonators are activated/deactivated by switching-on/switching-off said resonators to/from said configuration receiving/transmitting antenna by selective operation of switching means by a user to selectively program the code of said configuration.

2. The system according to claim 1, wherein said resonators have different phase positions.

3. The system according to claim 1, wherein said configuration for at least one of identification and sensing is a sensor configuration to be interrogated, and said resonators include at least one SAW resonator for detecting at least one variable.

4. The system according to claim 3, wherein said resonators include a plurality of resonators having different mid-frequencies.

5. The system according to claim 1, wherein said transmitting and receiving apparatus includes a transmitting device for transmitting an interrogation pulse and a receiving device containing a Fourier transformation configuration for transforming a signal being transmitted back by said configuration for at least one of identification and sensing and being present in an amplitude/time spectrum, into an amplitude/frequency spectrum.

6. The system according to claim 5, wherein said configuration for at least one of identification and sensing is an identification mark ID tag to be interrogated, and said resonators are frequency-shifted SAW resonators forming an encoding of said ID tag.

7. The system according to claim 6, wherein a given number of said SAW resonators are encoded by activating/deactivating individual resonators.

8. A system for at least one of identification and sensing, comprising:

a configuration for at least one of identification and sensing having resonators for determining at least one parameter to be interrogated, said resonators storing energy from a broadband radio signal received thereby, which energy decreases in accordance with a time function; and a transmitting and receiving apparatus transmitting interrogation signals by radio to said configuration for at least one of identification and sensing and receiving and evaluating reply signals transmitted back from said configuration for at least one of identification and sensing, said transmitting and receiving apparatus being a broadband device;

wherein said resonators are SAW resonators forming an encoding of said configuration; wherein said configuration further has a receiving/transmitting antenna and said resonators are activated/deactivated by switching-on/switching-off said resonators to/from said configuration receiving/transmitting antenna by selective operation of switching means by a user to selectively program the code of said configuration.

* * * * *